Nov. 27, 1934.    T. R. HARRISON    1,982,300
MEASURING INSTRUMENT
Filed Jan. 8, 1929
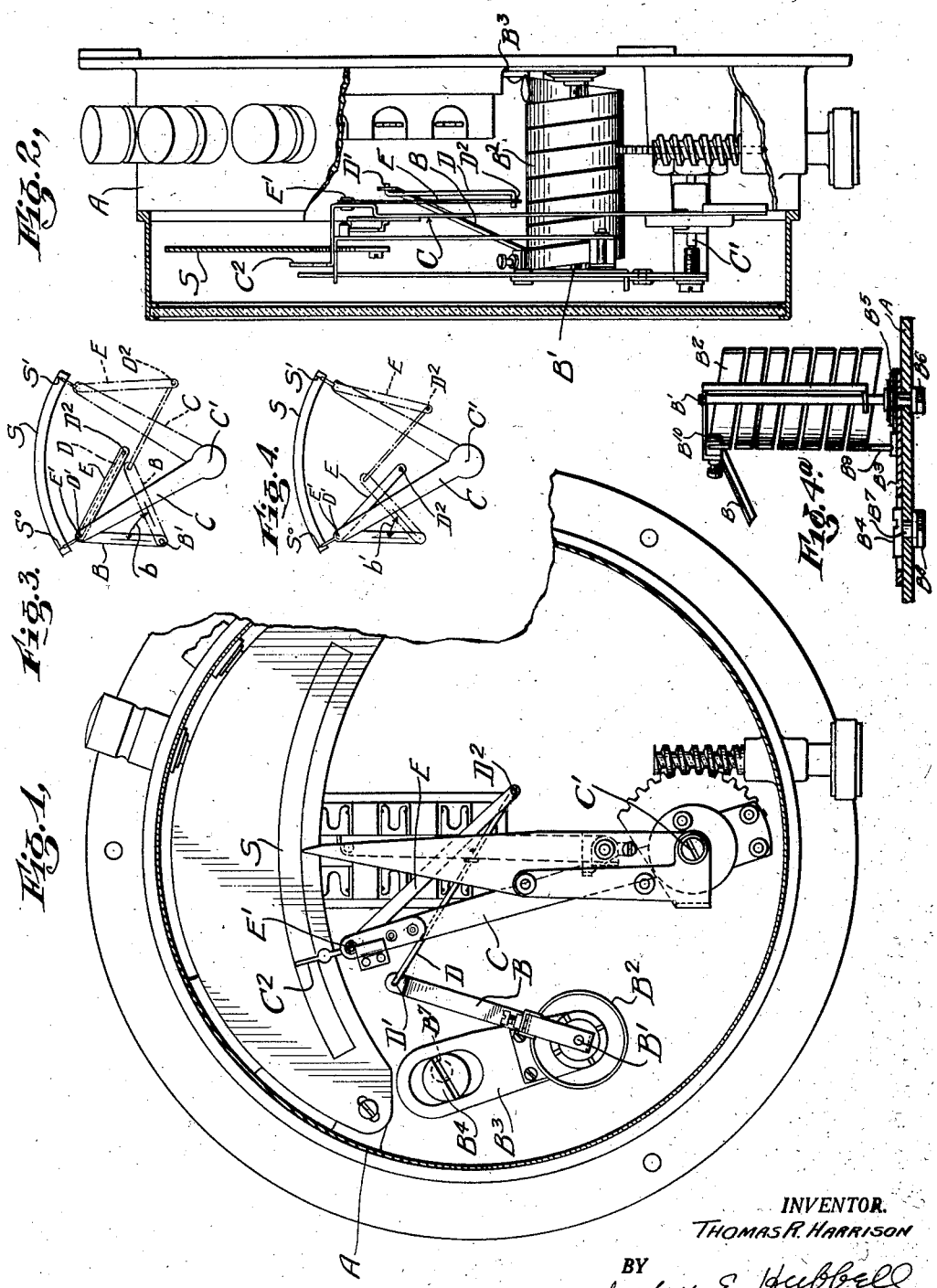
INVENTOR.
THOMAS R. HARRISON
BY
John E. Hubbell
ATTORNEY Patented Nov. 27, 1934

1,982,300

UNITED STATES PATENT OFFICE 1,982,300

MEASURING INSTRUMENT

Thomas Randolph Harrison, Wyncote, Pa., assignor to The Brown Instrument Company, Philadelphia, Pa., a corporation of Pennsylvania Application January 8, 1929, Serial No. 331,126

1 Claim. (Cl. 73—151)

The present invention relates to measuring instruments of the type comprising an indicating element pivoted to turn about one axis and an actuator for said element pivoted to turn about a different axis, and the general object of the present invention is to provide a connection between the actuating and indicating elements in an instrument of the type described, of novel construction and adapted to facilitate the instrument calibration, and in particular, to facilitate the adjustment required to insure that a given turning movement of the actuating member away from its initial or zero position will give a desired extent of angular movement of the indicating element away from the zero position of the latter.

The special form of connection between the actuating and indicating elements which I have devised for the general purpose described, is characterized by its capacity for adjustment to vary the leverage through which the actuating element acts upon the indicating element without varying the initial or zero position of either element.

The various features of novelty which characterize my invention are pointed out with particularity in the claim annexed to and forming a part of this specification. For a better understanding of the invention, however, and the advantages possessed by it reference should be had to the accompanying drawing and descriptive matter in which I have illustrated and described preferred embodiments of the invention.

Of the drawing:

Fig. 1 is an elevation with parts broken away and in section of an instrument embodying one form of the present invention;

Fig. 2 is an elevation taken at right angles to Fig. 1 with parts broken away and in section;

Fig. 3 is a diagrammatic representation of the instrument shown in Figs. 1 and 2 with parts in different relative positions; and Fig. 4 is a view taken similarly to Fig. 3 showing parts in relative positions occupied in a different adjustment of the instrument.

Fig. 4a is a sectional view of the mounting for the Bourdon helix of the instrument of Fig. 1.

In the drawing I have illustrated the use of the present invention in an indicating control thermometer A of the type comprising an actuator arm B turning about an axis B' in response to variations in fluid pressure within a flattened tube B² to one end of which the arm B is secured. The tube B² is bent into a helix and has its end remote from the arm B attached to the base of the instrument A, the axis of the helix being that about which the arm B turns when the pressure within the tube increases or decreases. The instrument A comprises a pointer element C shown as pivotally mounted to turn about an axis C' parallel to, but laterally displaced from the axis B'. The free end C² of the indicator element C moves along a curved scale S.

Turning movements of the arm B impart proportional turning movements to the indicator C through a connection which includes a link D having one end pivotally connected at D' to the arm B, and having its other end pivotally connected at D² to a part E. The part E is rigidly secured to the pointer C in the normal operative condition of the instrument, but to permit the instrument to be calibrated in accordance with the present invention, the arm E is initially pivoted to the pointer C, E' representing the axis of the pivotal connection. The parts described are so proportioned and disposed that when the pointer C and the arm B occupy their respective zero positions as shown in full lines in Figs. 3 and 4, the axis D' of the pivotal connection between the arm B and the link D coincides with the axis E' of the pivotal connection of the part E with the pointer C. When the elements B and C are thus in their zero positions, the arm E and the link D can be angularly adjusted about their coincident pivotal axes without tending to move either the arm B or the pointer C. Advantageously, the support B³ for the fixed end of the tube B² is adjustably secured to the base of the instrument A to permit such angular adjustment of the arm B about the axis B' as may be necessary to bring the axes D' and E' into coincidence, with the index end C² of the pointer C at the zero mark S⁰ of the scale S.

As shown in Fig. 4a, shaft B' passes through an aperture in the base plate of the casing A, and through an aperture in the plate B³, the shaft B' being secured in position by collar B⁵ and nut B⁶. The shaft B' is free to turn in the aperture in the back plate of casing A, but is fixed by collar B⁵ to the plate B³. Eccentric B⁴ has shaft B⁷ extending through an aperture in the back plate of casing A and being secured thereto by nut B⁸. Rotation of the eccentric B⁴ shifts plate B³ about the axis of the shaft B', which shaft is carried for rotation with the plate B³. A helix B² is secured to the plate B³ as indicated at B⁹, so that the helix B² and shaft B' are angularly adjusted as a unit by the eccentric B⁴. Bracket B¹⁰ journalled on the shaft B', and connected to the helix B², holds the helix against lateral movement relative to the shaft B' during expansion and contraction thereof.

In calibrating the instrument A the part E is turned about the axis E' into whatever position is required to enable the arm B to act on the pointer with the proper leverage, after which the part E is rigidly secured to the pointer C. Where no re-calibration is to be expected, the part E may then be rigidly and permanently connected to the pointer C by soldering the parts together. The leverage with which the arm B acts on the pointer is determined in the type of construction shown, by the distance between the axis C' and the axis $D^2$ of the pivotal connection between the link D and the part E. The leverage normally required, is that with which the maximum expected angular displacement of the arm B will produce full scale deflection of the pointer C. In Fig. 3 the maximum expected displacement of the arm B is represented by the angle $b$ between the dotted and full line positions of the arm B, and the part E and the pointer C are secured together in such relative positions that with the arm B in its dotted line position, the index end $C^2$ of the pointer C will register with the maximum value point S' of the scale S. With a smaller expected maximum deflection of the arm B, for example that represented by the angle $b'$ in Fig. 4, the pointer C and part E are secured together with the distance between the axes C' and $D^2$ so decreased that such small deflection will bring the pointer index $C^2$ into register with the full range scale mark S'.

As previously stated, the instrument shown in Figs. 1 and 2 is a control thermometer, and comprises parts, shown in the drawing, which it is not necessary to describe herein, as they are well known in the art, and moreover form no part of the present invention, which is equally useful in the instruments differing materially in form and purpose from the instrument shown in Figs. 1 and 2.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claim and that in some cases certain features of my invention may be used to advantage without a corresponding use of other features.

Having now described my invention what I claim as new and desire to secure by Letters Patent is:

In a measuring instrument the combination of an actuating element pivoted to turn about one axis, an indicating element pivoted to turn about a different axis, a link pivotally connected at one end to one of said elements, a member to which the other end of said link is pivotally connected, and a pivotal connection between said member and the other of said elements, the distance between the two pivotal connections of the member being equal to the distance between the two pivotal connections of the link, and said elements being so arranged that in their zero position the pivotal connections between the elements and the lever and member, respectively, will coincide, whereby the leverage with which said actuating element acts on said indicating element may be varied by angular adjustment of said member and link about their respective pivotal connections to said elements, without disturbing the zero positions of said elements.

THOMAS RANDOLPH HARRISON.